United States Patent [19]

Renlund et al.

[11] Patent Number: 4,981,820
[45] Date of Patent: Jan. 1, 1991

[54] CELLULAR SILICON-OXY-CARBIDE GLASS FROM FOAMED SILICONE RESINS

[75] Inventors: Gary M. Renlund, Scotia; William P. Minnear, Schenectady; Angelo A. Bracco, Albany, all of N.Y.

[73] Assignee: General Electric Company, Schenectady, N.Y.

[21] Appl. No.: 386,327

[22] Filed: Jul. 28, 1989

[51] Int. Cl.$^5$ .................. C03C 11/00; B29C 65/00; C04B 38/00

[52] U.S. Cl. .................. 501/39; 501/27; 501/80; 501/53; 501/55; 501/82; 501/84; 264/44; 264/DIG. 17; 264/DIG. 48; 264/DIG. 77

[58] Field of Search ............ 501/12, 27, 39, 53, 501/55, 82, 84, 87, 88; 264/44, DIG. 17, DIG. 48, DIG. 77

[56] References Cited

U.S. PATENT DOCUMENTS

| Re. 32,107 | 4/1986 | January | 501/87 |
|---|---|---|---|
| 2,536,192 | 6/1945 | Littleton | 49/79 |
| 2,544,954 | 3/1951 | Ford | 49/77 |
| 2,596,659 | 5/1949 | D'Eustachio | 49/77 |
| 2,596,669 | 5/1952 | Ford | 106/40 |
| 2,600,525 | 3/1947 | Ford | 106/40 |
| 2,620,597 | 4/1947 | Ford | 49/77 |
| 3,833,386 | 9/1974 | Wood et al. | 106/41 |
| 4,192,664 | 3/1980 | Joshi | 65/22 |
| 4,274,825 | 6/1981 | North | 432/13 |

OTHER PUBLICATIONS

Hypol Plus Laboratory Procedures and Foam Formulations Technical Brochure, Organic Chemicals Division, W. R. Grace & Co., Mass.

"Dimethyldietoxysilane/Tetraethoxysilane Copolymers: Precursors for the Si—C—O—System", Babonneau, F., Thorne, K., and Mackenzie, J. D. Chemistry of Materials, vol. I, No. 5, pp. 554-558, Oct. 1989.

Primary Examiner—William R. Dixon, Jr.
Assistant Examiner—Melissa Bonner
Attorney, Agent, or Firm—James E. McGinness; James C. Davis, Jr.; James Magee, Jr.

[57] ABSTRACT

Cellular glass structures are made by foaming select silicone resins. A foaming agent is reacted together with the silicone resin to form a foam that carries the resin as a continuous separate phase distributed throughout the foam. The foaming agent is removed by decomposition, and the remaining silicone resin is crosslinked to retain the foamed structure. The silicone resin is then heated in a non-oxidizing atmosphere at a temperature that will pyrolize the resin. During pyrolysis, the resin densifies to foam a unique glass composition comprised of silicon, oxygen and carbon, where carbon is chemically bonded to silicon, but there are essentially no chemical bonds between carbon and oxygen.

9 Claims, 4 Drawing Sheets

CELLULAR SILICON-OXY-CARBIDE GLASS FROM FOAMED SILICONE RESINS

CROSS REFERENCES TO RELATED APPLICATIONS

The subject application relates to copending applications for Ser. No. 359,619, filed June 1, 1989; Ser. No. 428,711, filed Oct. 30, 1989; and Ser. No. 439,059, filed Nov. 20, 1989.

BACKGROUND OF THE INVENTION

The present invention relates to cellular glass structures and in particular to cellular glass structures composed of silicon, oxygen, and carbon made from foamed silicone resins.

Amorphous silica is a refractory glass, however, it devitrifies readily at temperatures greater than 1100° C. Devitrification refers to the ordering or crystallization of the random structures that glasses are made of. Crystallization drastically reduces one of vitreous silicas predominant attributes, i.e., its low thermal expansion, as well as many of its other desirable properties. As a result, much research has been directed to seeking ways to increase the resistance to devitrification in silica glass compositions.

Reactions between silicon, carbon, and oxygen have been studied extensively. Some of the known reactions in a silicon, carbon, and oxygen system include oxygen combining with silicon to form silica, $SiO_2$. Then at temperatures in excess of 1100° C. silica begins to crystallize to form cristobalite. Cristobalite is one of the common mineral forms of silica. Carbon can react with available silica to form crystalline silicon carbide or escape as carbon monoxide gas. Any carbon remaining as elemental carbon readily oxidizes above 600° C. when exposed to air.

The thermodynamics of silicon, carbon and oxygen reactions is discussed in "The High-Temperature Oxidation, Reduction, and Volatilization Reactions of Silicon and Silicon Carbide", Gulbransen, E. A., and Jansson, S. A. Oxidation of Metals, Volume 4, Number 3, 1972. The thermodynamic analysis of Gulbransen et al. shows that at 1200° C. silica and carbon should form gaseous silicon monoxide and carbon monoxide or solid silicon carbide, SiC. However, no material containing silicon, oxygen and carbon would be expected to form. Gulbransen et al. conclude that silica was not recommended for use in reducing atmospheres above 1125° C. due to the formation of volatile silicon monoxide gas. Also, silicon carbide was not recommended for use in oxygen containing environments where active oxidation may occur due to oxidation of the silicon carbide.

There is a material functionally described as carbon modified vitreous silica and herein referred to as "black glass" where 1-3 percent carbon has been added to silica. The method for making black glass is disclosed by Smith et al. in U.S. Pat. No. 3,378,431. Carbonaceous organics such as carbowax are added to silica and the mixture is hot pressed at about 1200° C. to form black glass. Smith, C. F., Jr. has further characterized black glass by infrared spectroscopy in "The Vibrational Spectra of High Purity and Chemically Substituted Vitreous Silicas", PhD Thesis, Alfred University, Alfred, N.Y., May 1973. Smith discloses that, in addition to elemental carbon dispersed in the glass, carbon in black glass is associated with oxygen in carbonato type groups. A carbonato group is the description of a particular way that a carbon atom bonds with three oxygen atoms and has the structure, The mechanical strength of black glass is similar to the strength of carbon-free silica glass, however black glass has an increased resistance to devitrification over conventional silica glass which begins to devitrify at about 1100° C., while black glass begins to devitrify at about 1250° C. The increased thermal stability of black glass allows it to be used at temperatures higher than vitreous silica can withstand.

In a commercially produced continuous silicon carbide ceramic fibre sold under the trademark "Nicalon", about 10 percent oxygen is introduced into the fibre to crosslink it. After crosslinking, the fibres are pyrolized and it is believed that the oxygen becomes part of the fibre as an amorphous contaminant, probably in the form of silica. The degradation behavior of such fibres after heat treatment in various environments was reported in the article "Thermal Stability of SiC Fibres (Nicalon®)", Mah, T., et al., Journal of Material Science, Vol. 19, pp. 1191-1201 (1984). Mah et al. found that regardless of the environmental conditions during heat treatment, the "Nicalon" fibre strength degraded when the fibres were subjected to temperatures greater than 1200° C. The fibre degradation was associated with loss of carbon monoxide from the fibres and beta-silicon carbide grain growth in the fibres.

From the discussion above, it is apparent that the properties of known ceramic or glass compositions, and specifically those containing silicon, oxygen and carbon, are degraded by decomposition or devitrification of the glass or ceramic at temperatures above 1100° C. to 1250° C.

Heretofore known methods of forming glass or ceramic materials into cellular glass or ceramic structures utilize glass or ceramic powders or slurries of the powders to form the cellular body. For example, in some methods cellular glass and ceramic structures are formed from glass or mineral powders that are intimately mixed with a gas-producing agent, such as carbon black. The mixture is heated to a temperature sufficient to sinter and cohere the particles of glass or mineral and simultaneously liberate bubbles of gas in relatively uniform distribution in the sintered mass.

Another method for forming cellular ceramic structures is disclosed in U.S. Pat. No. 3,833,386. An isocyanate capped polyoxyethylene polyol is reacted with large amounts of an aqueous slurry of sinterable ceramic material. A hydrophilic crosslinked polyurethane foam is generated having sinterable material uniformly disposed throughout. The foamed structure is heated in an atmosphere of air, oxygen, inert gases or the like to decompose the polyurethane and sinter the remaining sinterable ceramic material forming a rigid ceramic foam structure.

An important property of cellular glass structures is the degree to which the cell walls are open or closed. Open cell walls provide intercommunication between cells so that the cellular body can act as a filter or sound absorbing structure. With closed cell walls there is no intercommunication between cells and the cellular body has better insulating properties. One method for providing open cell walls in sintered cellular glass structures is disclosed in U.S. Pat. No. 2,596,659. A closed cell structure is subjected to fluid pressure and the thin walls of the cells at their weakest points tend to rupture in a manner that provides communication between cells.

The durability of prior art cellular glass structures in certain agencies, such as water at elevated temperatures, was not all that might be desired because the alkali content tended to leach out, causing disintegration or deterioration of the cellular glass.

Sintered ceramic bodies inherently contain up to 10 percent porosity, which porosity reduces the strength of the ceramic body. One method of reducing the porosity and improving the strength of sintered ceramics is to re-infiltrate the ceramic body with the powdered ceramic and sinter the reinfiltrated ceramic. This can be repeated many times to continue filling matrix porosity. However, such methods of filling porosity in ceramic bodies would be difficult to perform in sintered cellular ceramic structures. Such re-infiltration would fill the cells in cellular structures having open cell walls and would fill the porosity on the outer surface of cellular structures having closed cell walls leaving porous cell walls inside the structure unaffected.

Sintered ceramics are also known, to exhibit grain boundaries that block the mass transport of second phase particles causing an uneven distribution of the second phase particles in the ceramic body.

Therefore, it is an object of this invention to form a cellular glass structure, comprising silicon, oxygen and carbon wherein a substantial portion of the carbon atoms are bonded to silicon atoms and the remaining carbon is elemental carbon dispersed in the glass matrix. Such cellular glass structures remain structurally stable and do not decompose in oxidizing or reducing atmospheres at temperatures up to at least 1650° C.

Another object of this invention is a process for forming cellular glass structures comprised of silicon, oxygen and carbon by pyrolyzing foamed methyl silicone resins.

Another object of this invention is a process for forming cellular glass structures comprised of silicon, oxygen and carbon where the cell walls are essentially fully dense, amorphous, and free of grain boundaries.

BRIEF DESCRIPTION OF THE INVENTION

We have found that some silicone resins can be foamed and then pyrolized in a non-oxidizing atmosphere to form unique glass compositions in a cellular structure. Surprisingly, we have found that these silicone resins when pyrolized in a non-oxidizing atmosphere do not combine to form silica, cristobalite, silicon carbide, carbon monoxide or a mixture of silica and carbon.

While prior art cellular glass or ceramic bodies are formed by sintering powdered glasses, ceramics, or minerals or slurries of the powders, the cellular glass structures of this invention are formed by pyrolizing foamed silicone resins. Select silicone resins are mixed with a solvent, a foaming agent and sometimes a curing agent for crosslinking the resin. The foaming agent is reacted to form a carrier foam with resin disposed throughout the foam as a continuous separate phase. Although the phase separation may not be readily resolved when inspected microscopically, the carrier foam can be decomposed and removed while the silicone resin remains as a foamed structure. Therefore, as used herein, continuous separate phases are phases that can at least be separated by decomposition of one of the phases.

Solvent and excess water are removed from the foam by drying. The resin is crosslinked after the foam forms so that the resin retains the foamed structure. Crosslinking of the resin can be aided by the addition of the curing agent; however, some resins will crosslink sufficiently to retain the foamed structure during drying without adding the curing agent. After the resin has crosslinked, the carrier foam is removed by decomposition. The remaining foamed resin structure is heated in a non-oxidizing atmosphere to pyrolize the resin, and the pyrolizing resin densifies to form a cellular glass structure.

As used herein, a non-oxidizing atmosphere is an atmosphere that will remove reaction products from the pyrolizing resin without influencing the reactions occurring during pyrolysis. Examples of such non-oxidizing atmospheres are inert atmospheres like helium, argon and nitrogen, and reducing atmospheres such as hydrogen. A vacuum having a pressure below about $10^{-4}$ atmospheres can also be used.

Methyl silicones are made up of siloxane chains with methyl groups attached to the silicon atoms. Siloxane chains contain an alternating linkage of silicon and oxygen atoms. Several combinations of methyl groups can form on the siloxane chains to form polymethylpolysiloxanes.

The basic unit structures in polymethylpolysiloxanes are trimethylsiloxy, dimethylsiloxy, and monomethyl siloxane. The trimethylsiloxy monofunctional unit at the end of a siloxane chain has the structure;

Dimethylsiloxy is a difunctional unit that builds chains or rings and has the structure;

Monomethyl siloxane is a trifunctional unit and not only extends siloxane chains but also crosslinks between chains and has the structure;

Methyl silicone resins may also contain unsubstituted tetrafunctional units herein referred to as Q units and having the structure;

Polymeric structures can be built from these unit structures to form polymethylpolysiloxanes having a desired number of methyl groups per silicon atom. By varying the ratio of methyl groups to silicon atoms different methyl silicone resins are formed having more or less organic substituent, the organic substituent being the methyl groups. Methyl silicone resins generally contain a ratio of methyl groups to silicon atoms of about 2:1 or less. A first methyl silicone resin that can be foamed according to the method of this invention and pyrolized to form a cellular glass structure is comprised of, by weight percent, about 5 percent dimethylsiloxy and about 95 percent monomethyl siloxane. Methods for making the first methyl silicone resin are disclosed in U.S. Pat. No. 4,026,868 incorporated by reference herein. A second group of resins that can be foamed and pyrolized to form cellular glass structures is comprised of trimethylsiloxy and unsubstituted tetrafunctional Q units in the ratio of about 0.3:1 to 2.5:1. Methods for making the second methyl silicone resin are disclosed in U.S. Pat. No. 2,676,182 incorporated by reference herein. The first and second methyl silicone resins described above are hereafter referred to and claimed as a methyl silicone precursor resin or sometimes as the precursor resin or resin.

One method for foaming the precursor resin is to dissolve it in a nonpolar organic solvent, intimately mix the dissolved resin with a foaming agent, and react the foaming agent by stirring water into the mixture. When the first methyl silicone resin described above is used, a curing agent for the precursor resin can also be added to the resin mixture before the water is added to react the foaming agent.

A suitable foaming agent is the isocyonate capped polyoxyethylene polyol reaction product having an average isocyonate functionality greater than 2 and up to about 6 or more. Methods for making such isocyonate capped polyoxyethylene polyol reaction products are disclosed in U.S. Pat. No. 3,833,386, incorporated by reference herein. A nonpolar organic solvent such as toluene, and a curing agent such as a silicon containing amine can be used as the other additives in the resin solution.

Additives in the precursor resin solution are added in the amounts of; about one part foaming agent to about 0.1 to two parts resin, the nonpolar organic solvent is present in an amount that will at least dissolve the resin and up to an amount that does not dilute the foaming agent so that it does not foam properly, such amounts of solvent are about 10 to 50 weight percent of the foaming agent, the curing agent is about 0.1 to 4 weight percent of the resin and is added preferably when the first methyl silicone resin described above is used, and water is stirred into the solution in the amount of about 2 to 250 percent by weight of the foaming agent. Stirring continues until the solution turns creamy, at which time foaming and crosslinking of the foaming agent begins. The water added to the precursor resin solution reacts with the foaming agent to form a hydrophilic crosslinked polyurethane foam. The polyurethane foam acts as a carrier for the precursor resin so that the resin is uniformly disposed throughout the foamed structure as a continuous separate phase.

In the above method, two separate polymerization reactions are made to occur in a specific order while avoiding interference in the separate reactions. The foaming agent must polymerize first to form the polyurethane foam without being affected by the precursor resin or the polymerization reaction of the precursor resin. For example, if the precursor resin crosslinks too quickly, the foaming reaction is restricted and the polyurethane foam will not form properly. The precursor resin, solvents, curing agents and the amounts of each of the additives specified in the method above have been found to not interact with the foaming agent so that when mixed together the polyurethane foam is formed and the resin is distributed as a continuous separate phase in the foam.

Solid particulated or fiberous fillers such as catalysts, ceramics, silica, diatomaceous earth or alumina can be added to the resin prior to foaming to impart additional thermal, electrical or other desired properties to the cellular glass structure. When fillers are added to the precursor resin solution, the precursor resin can be added in amounts from about one part foaming agent to 0.05 to 1 part resin.

Commercially produced surfactants sold under the trademark "Pluronic" polyols may be added to the solution to modify cell size, foam rise height, and relative amounts of closed or open cells in the foam. Such surfactants may be added in amounts up to 10 weight percent of the foaming agent.

The initial temperature of the resin solution can be controlled by preheating each additive before it is added to the solution. Higher solution temperatures cause the foaming action to increase and produce a larger cell size in the foam. Sufficient foaming occurs with solution temperatures of 0° C. to 95° C. Because the foaming reaction is exothermic, the solution temperature increases after foaming begins.

When foaming is complete, the foaming agent has formed a hydrophilic crosslinked polyurethane foam structure, sometimes herein referred to as a carrier foam, capable of supporting the precursor resin in a foamed structure. The foamed structure is dried to evaporate water and the organic solvent. Drying may be conducted from room temperature to just below the flash point temperature of the organic solvent. While the foamed structure is drying, the precursor resin is crosslinked to retain the foamed structure without the support of the carrier foam.

The polyurethane is then removed from the foamed structure by heating between about 150° C. to 400° C. Such heating decomposes the polyurethane and can be carried out in an atmosphere that removes the vaporizing polyurethane, water and organic solvent without contributing to other reactions in the resin. Inert atmospheres, air or a vacuum can be used.

The foamed precursor resin is then pyrolized by heating to between about 900° C. and 1600° C. in a non-oxidizing atmosphere. During pyrolysis the foamed resin densifies into a cellular glass structure as water, methyl groups and other decomposition products from the resin evolve and produce a weight loss in the resin. Heating is stopped when a substantially constant weight is achieved in the pyrolizing resin. It should be understood that the cellular structure of the foamed resin is retained, it is the resin that densifies forming essentially fully dense cell walls in the cellular structure. Further densification of the pyrolizing resin may occur after weight loss has ended, if heating is continued. Therefore, it sometimes may be desirable to stop heating and pyrolysis of the resin after it has completely densified, or in other words, stops reducing in volume. Weight loss during pyrolysis was determined to be from about 11 to 80 percent. It was found that the methyl silicone precursor resins could be pyrolyzed at temperatures ranging from about 900° C. to 1600° C.

Pyrolysis of the methyl silicone precursor resin forms a cellular glass structure that is characterized by a continued sharing of electrons between atoms of silicon, oxygen and carbon in the glass. Silicon is present in four polyatomic units; in one unit, herein referred to as tetraoxysilicon, a silicon atom is bonded to four oxygen atoms and has the chemical formula $SiO_2$; in a second unit, herein referred to as monocarbosiloxane, a silicon atom is bonded to three oxygen atoms and one carbon atom and has the chemical formula $SiO_{1.5}C_{0.25}$; in a third unit, herein referred to as dicarbosiloxane, a silicon atom is bonded to two oxygen atoms and two carbon atoms and has the chemical formula $SiOC_{0.5}$; and in a fourth unit, herein referred to as tetracarbosilicon, a silicon atom is bonded to four carbon atoms and has the chemical formula $SiC$.

When the precursor resin consisting of 5 percent dimethylsiloxy and 95 percent monomethyl siloxane is foamed and pyrolyzed as disclosed herein, a first cellular glass structure is formed having a distribution of such polyatomic units in a cellular glass matrix, comprising in weight percent about 38 to 48 percent tetraoxysilicon, about 11 to 21 percent monocarbosiloxane, about 11 to 21 percent dicarbosiloxane, about 12 to 22 percent tetracarbosilicon, and about 3 to 9 percent elemental carbon dispersed atomically or in small clusters within the glass matrix. When the precursor resin consisting of trimethylsiloxy and Q units in a ratio of about 0.8:1 is foamed and pyrolyzed as disclosed herein a second cellular glass structure is formed having a distribution of such polyatomic units in a cellular glass matrix; comprising in weight percent about 18 to 28 percent tetraoxysilicon, about 21 to 31 percent monocarbosiloxane, about 12 to 22 percent dicarbosiloxane, about 28 to 38 percent tetracarbosilicon, and up to about 1 percent elemental carbon is dispersed atomically or in small clusters within the glass matrix. The polyatomic units in such first and second glass compositions are linked primarily by chemical bonding between silicon and oxygen atoms and silicon and carbon atoms with a small and insignificant number of bonds between carbon and oxygen atoms.

The first cellular glass structure of this invention can alternatively be described as a composition of silicon, oxygen and carbon in a mass of cellular silicon-oxy-carbide glass wherein about 54 to 64 percent of the silicon atoms are each separately bonded to at least an individual carbon atom, and about 3 to 9 weight percent carbon is present as elemental carbon dispersed atomically or in small clusters within the glass matrix so that there are no detectable carbonato groups. The second cellular glass structure of this invention can alternatively be described as a composition of silicon, oxygen and carbon in a mass of cellular silicon-oxy-carbide glass wherein about 73 to 83 percent of the silicon atoms are each separately bonded to at least an individual carbon atom, and up to about 1 percent elemental carbon is dispersed atomically or in small clusters within the glass matrix. These glasses both resist crystallization and do not decompose in oxidizing or reducing atmospheres at temperatures up to at least 1650° C.

Glasses formed by the method of this invention and characterized by such unique properties are herein referred to as silicon-oxy-carbide glass. The carbon-silicon bonds discovered in the glasses of this invention have heretofore been unknown in silica glasses. In silica glasses, and specifically black glass, carbon has only been known to be present as an unbonded element in the silica matrix or in carbonato groups where carbon is bonded with oxygen.

Because the precursor resin forms an essentially fully dense cellular silicon-oxy-carbide glass structure the cellular glass structures of this invention will have greater strength than sintered ceramic cellular structures that inherently contain up to 10 percent porosity in the sintered cell walls of the ceramic. When particulated fillers are added to the precursor resin, they are uniformly distributed in the cellular silicon-oxy-carbide glass because it is amorphous and there is little resistance to mass transport of such second phase particles. By choosing ceramic fillers that sinter at the pyrolizing temperatures a cellular structure of sintered ceramic bound by silicon-oxy-carbide glass can be formed.

The durability of the cellular silicon-oxy-carbide glass will also be improved over prior art cellular glass structures since it does not contain alkalis or alkaline earths that have been found to leach out in agencies such as water at elevated temperatures, causing disintegration or deterioration of prior art cellular glasses.

BRIEF DESCRIPTION OF THE DRAWINGS

The following description of the invention will be more easily understood by making reference to the figures briefly described below.

DETAILED DESCRIPTION OF THE INVENTION

Glasses can be defined by two of their basic features; one feature being that glasses are formed from an extremely viscous supercooled liquid, and a second feature being that the liquids which form glasses possess a polymerized network structure with short-range order. The glasses of this invention are not made from supercooled liquids, but they do possess a polymerized network structure with short-range order. Instead of supercooling a liquid, the glasses of this invention are formed by pyrolyzing a methyl silicone precursor resin in a non-oxidizing atmosphere. However, the glasses of this invention have the short-range ordering characteristic found in glasses.

The first methyl silicone precursor resin described above is predominantly comprised of monomethyl siloxane units many of which units contain a hydrogen atom on one oxygen atom, i.e., a hydroxyl group. Crosslinking occurs in the resin when hydroxyl units combine to form a bond between silicon and oxygen and generate water. Other silicone resins made according to the method in the '868 and '182 patents can also be pyrolized to form unique carbonato free glasses comprising silicon, oxygen and carbon wherein carbon is bonded to silicon and some elemental carbon may be present in the glass matrix.

Silicone resins have a three dimensional structure with short-range order and can be described in terms of their stoichiometric compositions. The stoichiometric units in silicone resins contain a silicon atom bonded to oxygen atoms and radical groups. The radical groups, in silicone resins that may be pyrolized to form glasses, are formed from the monovalent hydrocarbon radicals and halogenated monovalent hydrocarbon radicals such as; alkyls, such as methyl, ethyl, propyl, isopropyl, butyl, octyl, dodecyl, and the like; cycloalkyls, such as cyclopentyl, cyclohexyl, cycloheptyl, and the like; aryls such as phenyl, naphthyl, tolyl, xylyl, and the like; aralkyls, such as benzyl, phenylethyl, phenylpropyl, and the like; halogenated derivatives of the aforesaid radicals including chloromethyl, trifluoromethyl, chloropropyl, chlorophenyl, dibromophenyl, tetrachlorophenyl, difluorophenyl, and the like; and alkenyls, such as vinyl, allyl, methallyl, butenyl, pentyl, and the like.

The four basic units in silicone resins are M groups having a silicon atom bonded to one oxygen atom and three organic radicals, D groups having a silicon atom bonded to two oxygen atoms and two organic radicals, T groups having a silicon atom bonded to three oxygen atoms and one organic radical, and Q groups having one silicon atom bonded to four oxygen atoms. A group of silicone resins that may be foamed and pyrolized to form cellular glass structures contain a combination of M, T, D and Q groups so that the ratio of organic radicals, as described above, to silicon atoms is between about 0.5:1 and 2:1. An example of a silicone resin that does not pyrolize to form silicon-oxy-carbide glass is comprised of T groups with one half of the radicals being phenyls and the other half being methyl radicals.

Solid particulated fillers can be added to the precursor resin before foaming. For example, hard, tough ceramic fillers such as alumina can be added to form a cellular glass that can be used as an abrasive. Fillers can be added up to 125 volume percent of the foaming agent. The particulated fillers can flocculate or aggregate when added to the precursor resin due to weak van der Waals forces or coulombic attractions between particles. Therefore, appropriate deflocculants for different fillers may be added to disperse the particles and form a two-phase suspension of the particles in the resin. For example, with a diatomaceous earth filler, hydrochloric acid of about 37 percent purity can be added as a deflocculant in amounts of about 4 to 6 weight percent of the filler.

An important property of foamed structures is the content of closed or open cells in the foam. For example, if the polymerization of the foaming agent is complete before foaming is complete, split or open cells will be produced in the foam. A foam having all closed cells will have good insulating and buoyant float properties, while foams having open cells will have better filtering and sound-absorbing characteristics. A foam containing a catalyst as a filler in the foam and having open cell walls would form a catalyzing surface for fluids or gases passing over or through the foam. Cellular silicon-oxy-carbide glasses having open cells may also be used as molten metal filters or exchange columns in chemical processes.

The content of closed cells or open cells in the foam can be controlled by using surfactants. "Pluronic" polyol surfactants may be added to the solution before the water is added to modify cell size and foam rise height as well as the open cell content in the foam. The synthesis of "Pluronic" polyol surfactants manufactured by BASF Wyandotte Corporation and used in the following examples is initiated by the controlled addition of propylene oxide to the two hydroxyl groups of a propylene glycol initiator. The resulting hydrophobe can be tailored to any desired length, varying from 800 to several thousands in molecular weight. A block copolymer is formed between the hydrophobic ethylene oxide base and the hydrophilic polyoxyethylene groups which are controlled in length to constitute from 10 percent to 80 percent by weight of the final molecule. Surfactants may be added in amounts up to 10 weight percent of the foaming agent.

Foamed precursor resins are pyrolized by heating them to temperatures ranging from 900° C. to 1600° C. in a nonoxidizing atmosphere. During pyrolysis, the precursor resin experiences weight loss as water, methyl groups, and other decomposition products from the resin evolved. Preferably, heating rates of less than about 1° C. per minute are used to allow sufficient evolution of the decomposition products without introducing bubbles, voids or defects in the glass cell walls. When the weight of the pyrolizing resin stabilizes, pyrolysis is substantially complete. Measured weight loss during pyrolysis varied from about 11 to 80 percent. Part of the weight loss can be attributed to variations in the amount of solvents retained in the resins from production of the resins.

The cellular silicon-oxy-carbide glasses formed by pyrolysis resist devitrification by remaining structurally stable at temperatures up to at least 1650° C. The term "structurally stable" refers to a bulk material that essentially retains the same microstructure from room temperature up to the elevated temperatures indicated. This means that minor changes may occur in the microstructure. Minor changes, such as the formation of small crystallized areas up to about 100 angstroms in an otherwise amorphous matrix have minimal affect on the bulk material. Therefore, structurally stable glasses of the present invention are essentially amorphous but may contain small crystallized areas of, for example, graphite, cristobalite or silicon carbide within the glass, or display minor amounts of cristobalite on the surfaces of the glass.

The following examples are offered to further illustrate the cellular silicon-oxy-carbide glass structure and method of formation. The first silicone precursor resin made by the method in the '868 patent and having methyl radical groups, and consisting of about 5 weight percent D groups and 95 weight percent T groups was used in examples 1, 2, 4, 5 and 6. The second silicone precursor resin made by the method in the '182 patent and having methyl radical groups, and consisting of M and Q groups in the ratio of 0.8:1 was used in examples 3 and 8.

The precursor resin was foamed by dissolving it in a nonpolar organic solvent while stirring in a curing agent for the resin, a foaming agent and water. Illustrative of the nonpolar organic solvents found to be acceptable are toluene, acetone, Freon or methylene chloride, polar organic solvents, such as alcohol, cannot be used. Illustrative of the resin curing agents that were found acceptable are silicon containing amines such as gamma aminopropyltriethoxysilane, bases such as ammonium hydroxide, and acids such as hydrochloric acid. The foaming agent used in the method of this invention is an isocyonate-capped polyoxyethylene polyol reaction product having an average isocyonate functionality greater than 2 and up to about 6 or more as discussed above. The additives are added in the amounts of about 2 parts resin to one part foaming agent, the nonpolar organic solvent is in the amount of about 10 to 50 weight percent of the foaming agent, the curing agent is added in the amount of about 0.1 to 4 weight percent of the precursor resin, and water is stirred into the solution in amounts of about 2 up to 250 weight percent of the foaming agent. The solution is stirred until it turns creamy, at which time the foaming and crosslinking of the foaming agent begins.

EXAMPLE 1

A solution containing 8 grams of precursor resin, 2.0 grams of tolulene and 0.2 grams of gamma aminopropyltriethoxysilane was prepared. This solution was intimately mixed with 8 grams of the foaming agent, and then 5 grams of water was stirred into the solution until it became creamy. The solution was allowed to foam and rise for 5 minutes, forming a foamed structure that was dry at room temperature. The foamed resin was then heated to 350° C. to decompose the polyurethane, and further heated at a rate of about 1° C. per minute to 1200° C. in a hydrogen atmosphere to pyrolize the precursor resin. The resulting cellular silicon-oxy-carbide glass contained about 15 pores per inch and consisted mainly of closed cell walls.

EXAMPLE 2

A solution containing 0.7 grams of precursor resin, 0.3 grams of tolulene, and 2 drops of gamma aminopropyltriethoxysilane was mixed to form a first solution. A second solution containing 10 grams of water, 5 grams of diatomaceous earth, 5 drops of 37 percent purity hydrochloric acid, and 0.25 grams of P85 "Pluronic" surfactant was then prepared. The first solution was intimately mixed with 8 grams of the foaming agent, and then the second solution was stirred in until the mixture was creamy in consistency. Foaming began and the mixture was allowed to rise and then dry for about 24 hours. The foamed resin was heated to 350° C. to decompose the polyurethane and further heated at a rate of about 1° C. per minute to 1200° C. in a hydrogen atmosphere to pyrolize the precursor resin. The resulting cellular silicon-oxy-carbide glass structure was a well-developed cellular structure containing 20 pores per inch, with significant cell wall breakage.

EXAMPLE 3

In Example 3, the second methyl silicone precursor resin described above, comprised of M and Q units in a ratio of about 0.8:1 was used as the precursor resin. Approximately 7 grams of precursor resin was dissolved in an excess amount of toluene The dissolved resin was heated to remove the excess toluene, leaving the precursor resin dissolved in about 2 grams of toluene About 8 grams of foaming agent was intimately mixed with the dissolved resin, after which about 5 cc of water was stirred in until the solution became creamy. The solution was allowed to rise for about 2 minutes and then dried at room temperature for about 24 hours. The foam was heated to 470° C. in 10 hours, and held at 470° C. for 1 hour to decompose the polyurethane foam. A black cellular structure remained after the polyurethane had been removed, demonstrating that the precursor resin had crosslinked sufficiently to retain the foamed structure without the support of the polyurethane carrier foam.

EXAMPLES 4-5

Two cured or crosslinked precursor resins were pyrolized while weight loss from the resins was measured by thermal gravimetric analysis. Thermal gravimetric analysis is a method for measuring weight loss from a sample while it is being heated. One example was heated in a hydrogen atmosphere and the other example was heated in a helium atmosphere at a rate of 10° C./minute until weight loss ended. The measured weight loss and final composition of the silicon-oxy-carbide glass formed after pyrolysis are shown in Table I.

TABLE I

| | Thermal Gravimetric Analysis of Pyrolized Resins | | | | | |
|---|---|---|---|---|---|---|
| Example No. | Sample Precursor Resin | Atmosphere | Weight Loss % | Composition Weight % | | |
| | | | | Si | O | C |
| 4 | cured | $H_2$ | 17.5 | 51 | 32 | 11 |
| 5 | cured | $H_e$ | 15.5 | 51 | 32 | 11 |

Carbon and silicon contents were determined by standard wet chemistry techniques. Oxygen content was measured by neutron activation.

Figure 1:
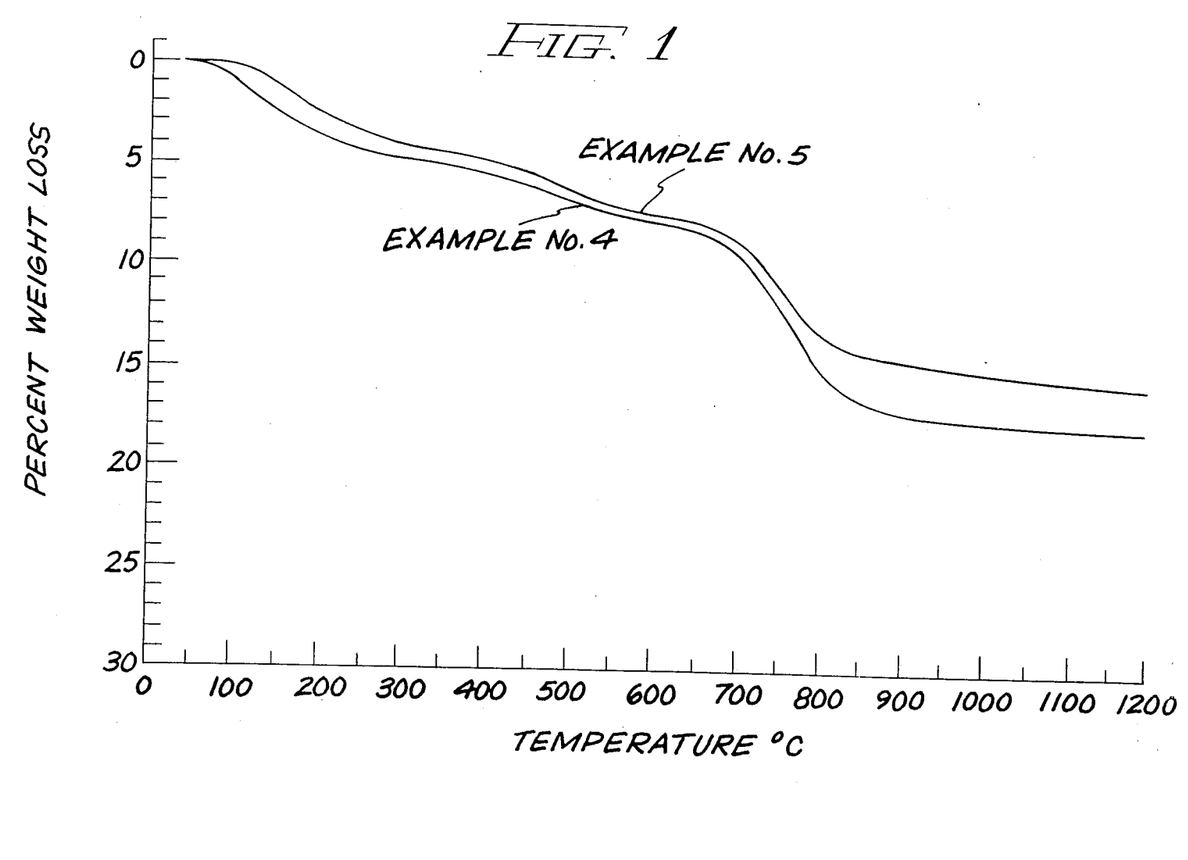
FIG. 1 is a graph showing the amount of weight lost during pyrolysis of methyl silicone precursor resins.

The weight loss data from Examples 4 and 5, as determined by thermal gravimetric analysis, is presented in the graph of FIG. 1. In the graph of FIG. 1, the percent weight loss in each sample is plotted on the ordinate while the increase in heating temperature is plotted on the abscissa. The graph of FIG. 1 shows that a significant portion of the weight loss in each sample has occurred at temperatures as low as 900° C. while weight loss was essentially completed at 1200° C.

EXAMPLES 6-8

Different glass compositions can be broadly defined by referring to the amount of each element in the glass. However, it is the short range ordering in glasses that give them their different properties. Therefore, by characterizing the short range ordering in glasses, different glass compositions can be defined with respect to properties. In Examples 6 and 8, the short range ordering of the silicon-oxycarbide glasses of this invention is determined by defining the percentage of each of the polyatomic units; tetrocarbosilicon, monocarbosiloxane, dicarbosiloxane, and tetraoxysilicon that are present in the glasses.

Figure 2:
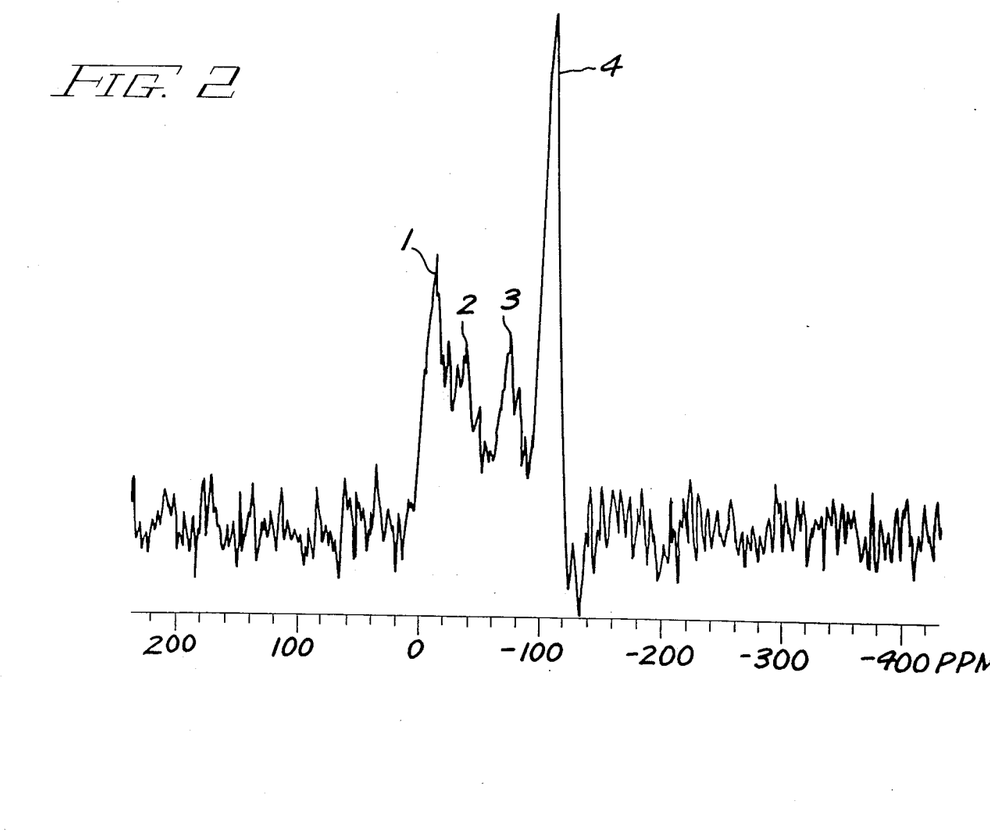
FIG. 2 is a graphical presentation of the $^{29}$Silicon nuclear magnetic resonance spectrum of silicon-oxycarbide glass made from a cured precursor resin.
Figure 3:
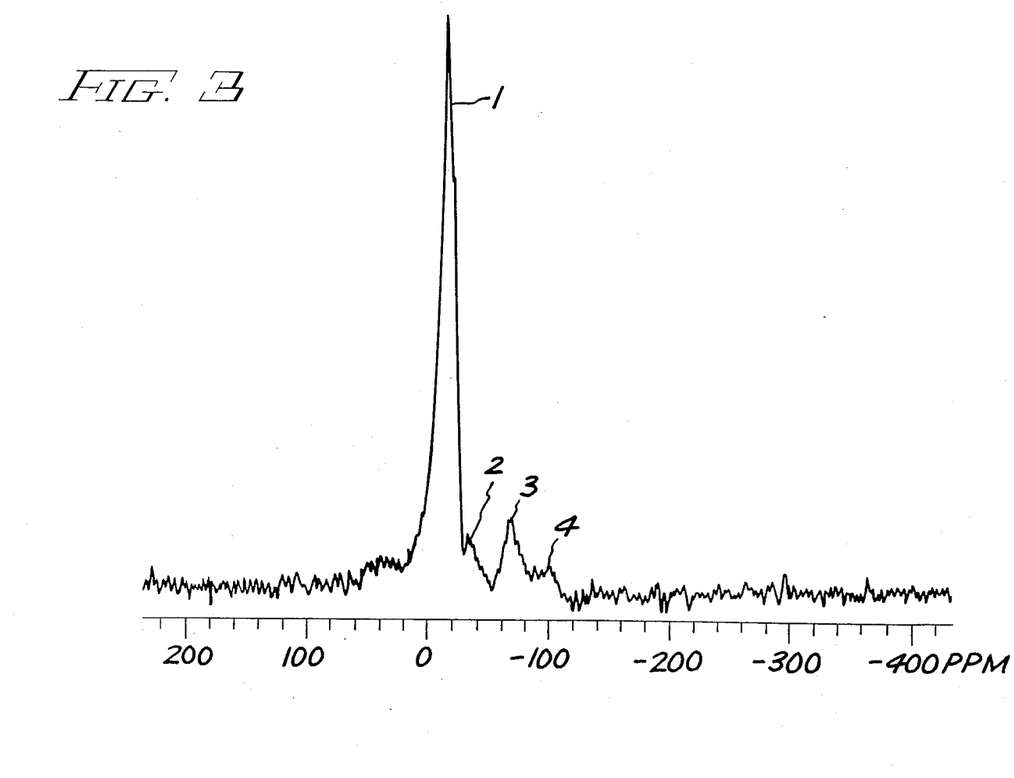
FIG. 3 is a graphical presentation of the $^{29}$Silicon nuclear magnetic resonance spectrum of "Nicalon" silicon-carbide.
Figure 4:
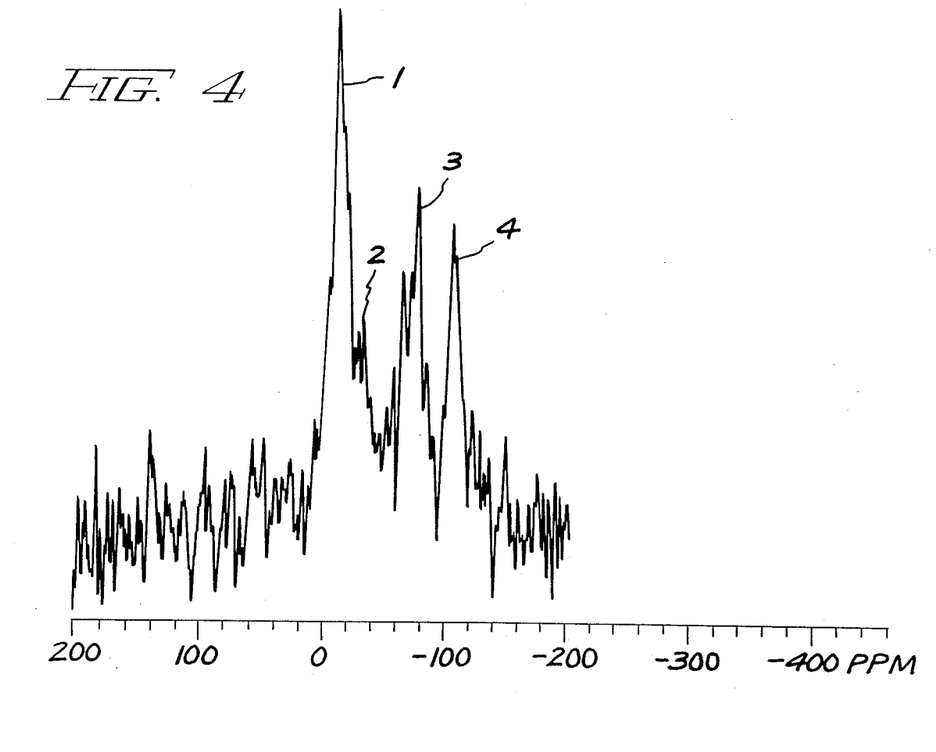
FIG. 4 is a graphical presentation of the $^{29}$Silicon nuclear magnetic resonance spectrum of silicon-oxycarbide glass made from an $M_{0.8}Q$ precursor resin.

For Examples 6 and 8, samples of silicon-oxy-carbide glass were prepared by pyrolizing samples of the first and second precursor resins respectively at 1100° C. to 1200° C. in flowing hydrogen. The first precursor resin was crosslinked prior to pyrolysis. FIGS. 2 and 4 present the $^{29}$Silicon solid state nuclear magnetic resonance spectra recorded from the silicon-oxy-carbide glass samples of Examples 6 and 8. FIG. 3 is the $^{29}$Silicon nuclear magnetic resonance spectrum of silicon carbide recorded from a sample of "Nicalon" silicon carbide fibre. On the ordinate is plotted the intensity of radiation measured from the excited sample, and on the abscissa is plotted the parts per million (ppm) in chemical shift from a tetra methyl silicone standard that fixes the zero point on the abscissa. Characteristic ppm in chemical shift are known for many polyatomic units, for example, tetraoxysilicon, dicarbosiloxane, and monocarbosiloxane are shown in; "NMR Basic Principles and Progress $^{29}$Si-NMR Spetroscopic Results", Editors P. Diehl, R. Kosfeld, Springer Verlag Berlin Heidelberg 1981 at pp. 186, 184 and 178. Therefore, each peak in FIGS. 2, 3 and 4 defines the short-range ordering of specific silicon polyatomic units. By integrating the area under each peak, the percentage of each of these polyatomic units present in the material can be determined.

Table II are considered to be within ±5 weight percent or ±5 mole percent for each polyatomic unit.

TABLE II

|  | Example 6 Silicon-Oxy-Carbide Glass from Crosslinked $D_{.05}T$ Resin | | Example 7 "Nicalon" SiC | | Example 8 Silicon-Oxy-Carbide From $M_{0.8}Q$ Resin | |
|---|---|---|---|---|---|---|
|  | Wt. % | Mole % | Wt. % | Mole % | Wt. % | Mole % |
| Tetraoxysilicon | 43 | 41 | 6.8 | 5 | 23 | 22 |
| Monocarbosiloxane | 16 | 16 | 16.7 | 13 | 26 | 26 |
| Dicarbosiloxane | 16 | 19 | 8 | 17 | 17 | 17 |
| Tetracarbosilicon | 17 | 24 | 68.5 | 75 | 33 | 35 |

Integration of the peaks in the spectra of FIG. 2 for the silicon-oxy-carbide glass made from the cured precursor resin reveals a composition that is ±5 percent of the following in weight percent; about 17 percent tetracarbosilicon, about 16 percent dicarbosiloxane, about 16 percent monocarbosiloxane, and about 43 percent tetraoxysilicon. In FIG. 2, peak 1 is tetracarbosilicon, peak 2 is dicarbosiloxane, peak 3 is monocarbosiloxane, and peak 4 is tetraoxysilicon.

This can be compared to the silicon carbide spectra in FIG. 3 that is Example 7. The composition for the "Nicalon" sample shown in FIG. 3, in weight percent, is about 68.5 percent silicon carbide, about 8 percent dicarbosiloxane, about 16.7 percent monocarbosiloxane, and about 5 percent tetraoxysilicon. From the spectra in FIG. 3, it can be seen that "Nicalon" fibres are comprised principally of silicon carbide with minor amounts of dicarbosiloxane, monocarbosiloxane, and tetraoxysilicon. In contrast, the spectra of FIG. 2 shows that the silicon-oxy-carbide glass made from the cured precursor resin is comprised principally of tetracarbosilicon, dicarbosiloxane, monocarbosiloxane, and tetraoxysilicon. This unique short range ordering of silicon-oxy-carbide glass that bonds carbon to silicon in a heretofore unknown manner in glasses, provides the increased devitrification and decomposition resistance and characterizes the glasses of this invention.

In FIG. 4, peak 1 is tetracarbosilicon, peak 2 is dicarbosiloxane, peak 3 is monocarbosiloxane, and peak 4 is tetraoxysilicon. Integration of the area under these peaks reveals the composition for the silicon-oxy-carbide glass of Example 8 as ±5 percent of the following in weight percent; about 33 percent tetracarbosilicon, about 17 percent dicarbosiloxane, about 26 percent monocarbosiloxane, and about 23 percent tetraoxysilicon. Analysis of the carbon content in the glass by standard wet chemistry techniques indicates that up to about 1 weight percent elemental carbon is dispersed throughout the glass.

The composition of the silicon-oxy-carbide glass samples and "Nicalon" sample described above can also be described by referring to the mole percent of each polyatomic unit. Table II below provides the conversion between mole percent and weight percent for each of these compositions. The compositions disclosed in Because "the mole unit is a molecular weight, the mole percent gives the percentage of each polyatomic unit in the samples. The percentage of the silicon atoms in the samples that is bonded to oxygen or carbon can then be determined using the mole percent. The silicon-oxy-carbide glass samples in Examples 6 and 8 had about 54 to 64 percent and 73 to 83 percent, respectively, of the silicon atoms in the glass bonded to at least an individual carbon atom. The "Nicalon" silicon carbide sample had about 90 to 100 percent of the silicon atoms in the silicon carbide sample bonded to carbon.

What is claimed is:

1. A method for preparing a cellular glass structure comprising:
   foaming an intimate mixture of a precursor resin and a foaming agent to form a carrier foam with the resin disposed throughout the carrier foam as a continuous separate phase, the resin being formed into a foamed structure;
   crosslinking the resin to retain the foamed structure without the support of the carrier foam;
   heating the foamed structure to remove the carrier foam by decomposition of the carrier foam; and
   heating the foamed precursor resin in a non-oxidizing atmosphere at a temperature that will pyrolize the resin, the heating of the precursor resin being performed for a period of time ending when weight loss from the pyrolizing resin substantially ends, the pyrolyzed resin forming a cellular glass structure that remains structurally stable at temperatures up to at least 1650° C.

2. The method for preparing a cellular glass structure according to claim 1 wherein the precursor resin is a silicone resin comprised of about 5 weight percent dimethylsiloxy and about 95 weight percent monomethyl siloxane.

3. The method for preparing a cellular glass structure according to claim 2 further comprising before the step of foaming, mixing a curing agent for the precursor resin with the precursor resin so that the precursor resin substantially crosslinks after foaming.

4. The method for preparing a cellular glass structure according to claim 1 wherein the precursor resin is a group of silicone resins comprised of trimethylsiloxy and Q units in the ratio of about 0.3:1 to about 2.5:1.

5. The method for preparing a cellular glass structure according to claim 1 wherein the heating to pyrolize the resin is performed at a heating rate less than about 1° C. per minute.

6. A method for forming a cellular glass structure, comprising:
   forming a solution containing; about 0.1 to 2 parts of a precursor resin to 1 part of a foaming agent, a nonpolar organic solvent that is about 10 to 50 weight percent of the foaming agent, a curing agent that is about 0.1 to 4 weight percent of the precursor resin, and water that is about 2 to 250 weight percent of the foaming agent, the solution being formed by dissolving the precursor resin in the solvent, intimately mixing the curing agent and foaming agent with the dissolved resin, and stirring the water into the intimate mixture until the solution becomes creamy in consistency;

allowing the solution to rise and form a polyurethane foam having the precursor resin disposed therein as a continuous separate phase so that the resin is formed into a foamed structure;

heating the foam to evaporate water and solvent, to remove the polyurethane by decomposing the polyurethane, and to crosslink the precursor resin so it retains the foamed structure; and heating the foamed precursor resin in a non-oxidizing atmosphere at a temperature that will pyrolize the resin, the heating of the precursor resin being performed for a period of time ending when weight loss from the pyrolizing resin substantially ends the pyrolized resin forming a cellular glass structure that remains structurally stable at temperatures up to at least 1650° C.

7. The method for forming a cellular glass structure according to claim 6 wherein the foaming agent is an isocyonate capped polyoxyethylene polyol reaction product having an average isocyonate functionality greater than 2 and up to about 6 or more.

8. The method for preparing a cellular glass structure according to claim 6 wherein the precursor resin is a silicone resin comprised of about 5 weight percent dimethylsiloxy and about 95 weight percent monomethyl siloxane.

9. The method for preparing a cellular glass structure according to claim 6 wherein the heating to pyrolize the resin is performed at a heating rate less than about 1° C. per minute.

* * * * *